United States Patent [19]

Carmean

[11] Patent Number: 4,855,832
[45] Date of Patent: Aug. 8, 1989

[54] GATED VIDEO MIXER

[75] Inventor: Ronald E. Carmean, Madison, Wis.

[73] Assignee: Nicolet Instrument Corporation, Madison, Wis.

[21] Appl. No.: 175,512

[22] Filed: Mar. 31, 1988

[51] Int. Cl.⁴ .......................................... H04N 5/265
[52] U.S. Cl. .................................................. 358/183
[58] Field of Search ..................... 358/183, 181, 22, 93

[56] References Cited

U.S. PATENT DOCUMENTS 4,070,695  1/1978  Scholz ................................. 358/183
4,507,683  3/1985  Griesshaber ........................ 358/183
4,647,974  3/1987  Butler ................................. 358/183
4,729,029  3/1988  Henri ................................. 358/183

Primary Examiner—Tommy P. Chin
Attorney, Agent, or Firm—Lathrop & Clark

[57] ABSTRACT

A video mixer circuit is used to combine two video signals, one of higher image quality than the other. The poorer of the two video signals is gated to clamp off its poorer signal during selected intervals of the video signal. The intervals of clamping off are determined by a discriminator sensitive to the voltage level of one of the video signals.

12 Claims, 3 Drawing Sheets

GATED VIDEO MIXER

FIELD OF THE INVENTION

The present invention relates to equipment for combining video signals in general, and relates, in particular, to a circuit for stripping sync from a composite video signal and then combining two distinct video signals without allowing the higher fidelity video signal to be degraded by the second video signal.

BACKGROUND OF THE INVENTION

It is sometimes necessary in creating composite video signals to either add two video signals together or to allow the output of one video image generator to be operated on by another video image generator. Often two images can be combined by a simple addition, i.e., the video images being synchronously electronically combined or added at a single node. Simple signal addition may be suitable in many purposes, in particular if the two video sources which are to be combined have equivalent resolution for their necessary purposes. This simple addition of video signals is inadequate in other applications, particularly if one video signal is of a particular high quality and may suffer degradation because of the lesser quality of the secondary video signal.

Shown in FIG. 1 is a block diagram of the prior art method of adding a video micrometer video signal to an x-ray microscopy video output in commercial equipment sold by the assignee of the present invention. The x-ray microscope is, as its name implies, a device for creating an enlarged video image of very small substrates, and is commonly used in industries requiring detailed work at a microscopic level, such as in integrated circuit processing and assembly. In such work, and particularly for use with integrated circuit technology, it is desirable if on the video output of the x-ray microscope video image a field, or scale, or reference cursor, is placed onto the x-ray microscope video image. In the apparatus constructed as indicated in FIG. 1, the output image of the x-ray microscope is passed through a video micrometer before being displayed on a video display tube or monitor. The video micrometer electronically creates a video image of a moveable reticles and combines it with the video output from the x-ray microscope to create what is, in effect, an overlay over the x-ray microscope video image which is the output of the x-ray microscope. The video micrometer synchronizes the overlay with the video image based on the sync pulse contained in the composite video signal which it receives from the x-ray microscope. The video micrometer then adds its overlay image to the composite video and passes that to its output which, as illustrated in FIG. 1, goes directly to the appropriate monitor.

Unfortunately, as may often be the case with video imagery, the resolution of all components of a system made of many components may not be equivalent. In the case illustrated in FIG. 1, the video micrometer may have a video output of poorer resolution or may create a sync in its composite output which may be less sharp than the composite video output from the x-ray microscope. The result would be that the output video image of the x-ray microscope would be slightly degraded by the insertion of the video micrometer between it and the monitor. This is not a desirable situation, since the whole purpose of a microscope is to gain the maximum possible resolution and acuity in the image created.

SUMMARY OF THE INVENTION

The present invention is summarized in that a video mixer is created which strips the sync pulse from a composite video and provides that sync pulse as an output, and which combines a composite video output with a secondary video output in such a fashion that any degradation contained in the secondary output is gated out so that the original composite video image is not degraded in the mixer.

It is an object of the present invention to provide a video mixer which may be utilized to combine the output of a video micrometer with a composite video output of an x-ray microscope without in anyway degrading the image created by the x-ray microscope so that maximum visual acuity and resolution is maintained in the image provided to the user.

It is another object of the present invention to provide a general use video mixer which may be utilized to combine signals of differing video quality while maintaining the resolution and acuity of the superior image.

It is another object of the present invention to provide such a mixer which can be easily constructed from readily available parts in an efficient and economical fashion.

Other objects, advantages, and features of the present invention will become apparent from the following specification, when taken in conjunction with the accompanying drawings.

DESCRIPTION OF THE PREFERRED EMBODIMENT

Figure 1:
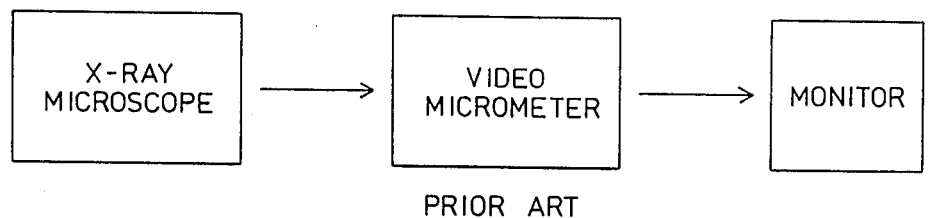
FIG. 1 is a schematic block diagram of the flow of the video signal in an x-ray microscope as utilized in a prior art assembly.
Figure 2:
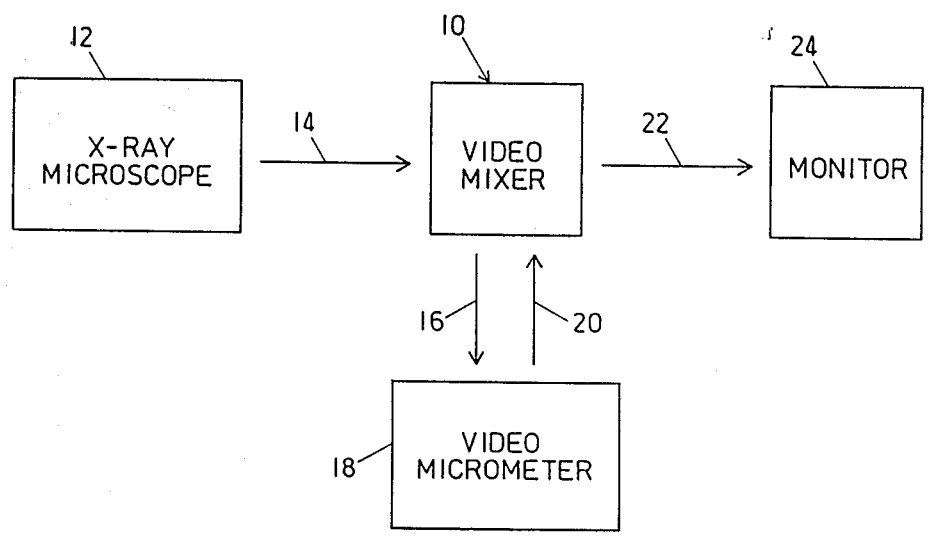
FIG. 2 is a schematic block diagram of how a video mixer in accordance with the present invention may be utilized in an x-ray microscope and video micrometer combination instrument.

Shown in FIG. 2 is a general schematic view of the connections to external parts of a video mixer circuit constructed in accordance with the present invention. The composite video output of a high quality source of video image, such as an x-ray microscope 12, is provided through an input video signal line 14 into a video mixer 10 constructed in accordance with the present invention. One output of the video mixer 10 is a synchronization pulse output 16 connected as an input to the secondary video device, in this case a video micrometer 18. The output of the video micrometer is a second composite video image, indicated on a second video signal input line 20 which is returned to the video mixer 10. The output of the video mixer 10 is a composite video output signal, carried on line 22, which is connected to a monitor 24 or other suitable visual display medium for ultimate display to the user.

Figure 3:
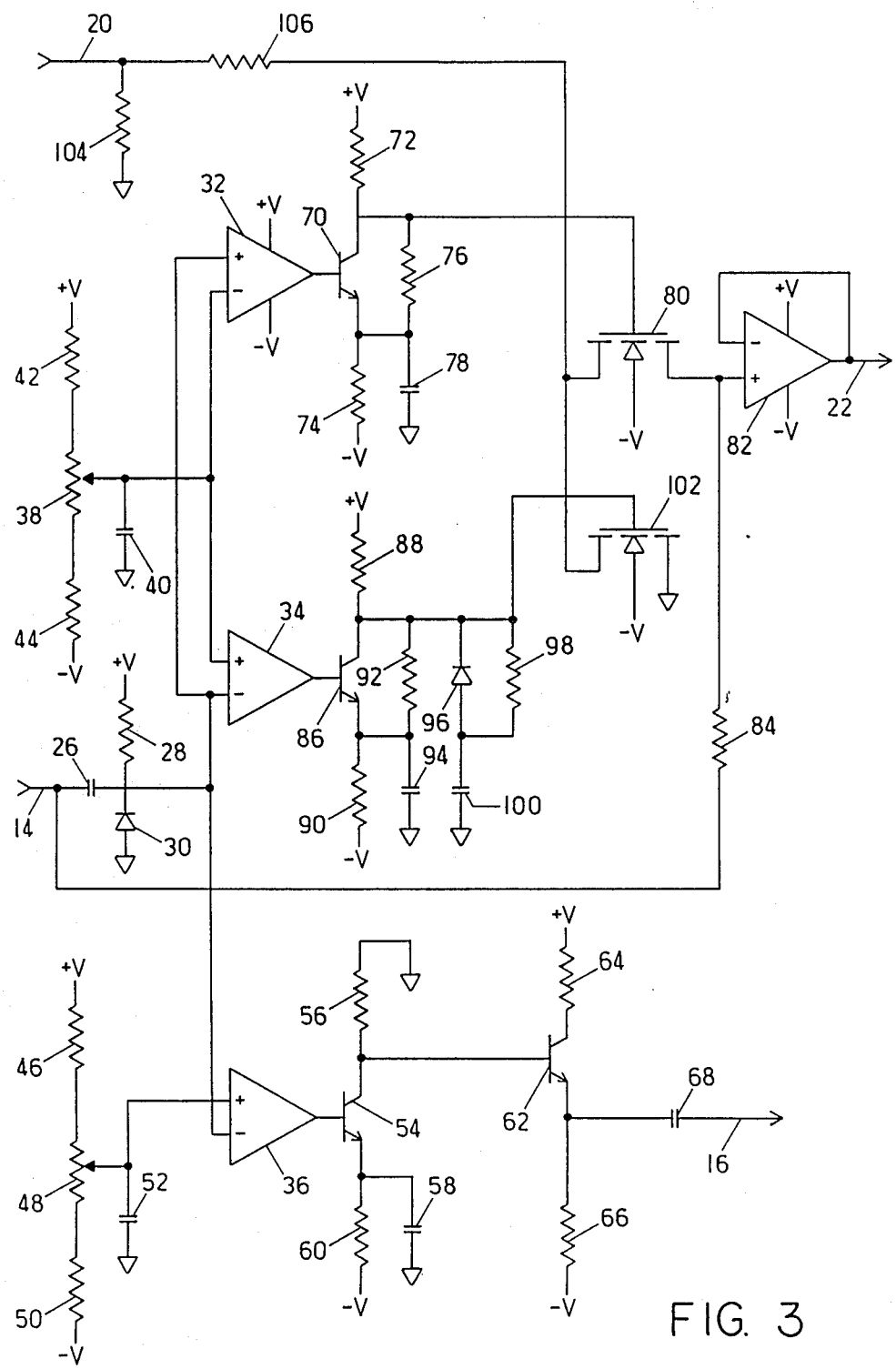
FIG. 3 is a circuit diagram one embodiment of the video mixer of FIG. 2.
Figure 4:
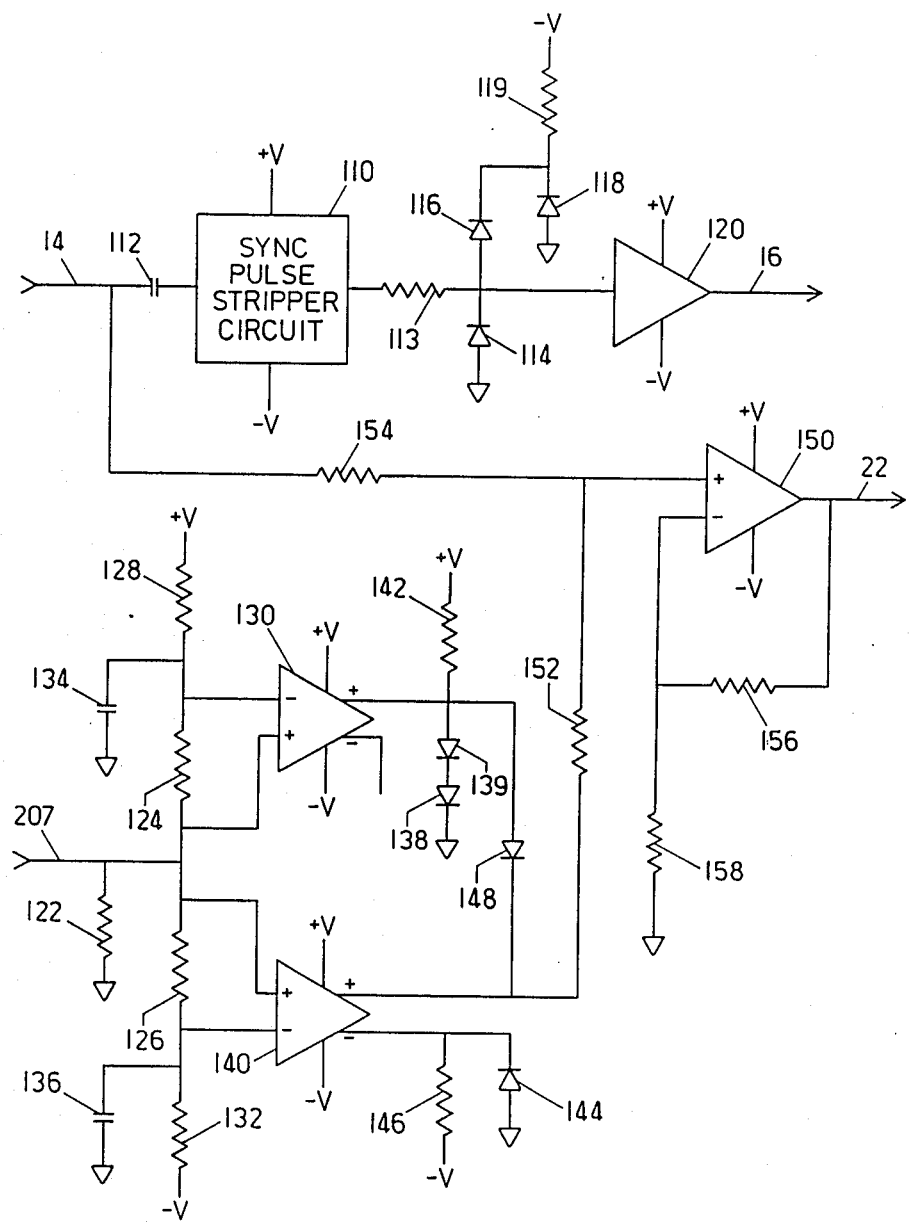
FIG. 4 is a circuit diagram of an alternative embodiment of the video mixer of FIG. 2.

Two versions of video mixers are described herein, illustrated in FIGS. 3 and 4. The circuit of FIG. 3 illustrates a video mixer which performs a time-domain segregation of the recording video signal so that the signal is gated off during defined intervals. The circuit of FIG. 4 performs a voltage-domain segregation so that only portions of the secondary video signal which fall within certain voltage ranges are passed through the video mixer.

Shown in FIG. 3 is a detailed circuit diagram of the video mixer 10. The original composite video into the video mixer 10 is applied to the video signal input line 14. That input line is connected through a capacitor 26 to the junction of a resistor 28 connected to the supply voltage and a diode 30 connected to ground, with the cathode of the diode 30 being the side that is connected to ground. The junction of the resistor 28 and the diode 30 is connected as an input to three operational amplifies 32, 34, and 36. That video signal input is connected to the non-inverting input to the operational amplifier 32 and is connected to the inverting input to the operational amplifiers 34 and 36. The amplifiers 32, 34, and 36 are all connected as comparators in the circuit of FIG. 3. The comparators 32 and 34 serve, with attached components, as a discriminator to control gating of the video signals. The comparator 36 serves, with other components, as a synch pulse stripper.

The inverting input to the comparator 32 is also connected to the non-inverting input to the comparator 34, and together these inputs are connected to the wiper arm of a variable resistor 38 and is also connected through a capacitor 40 to ground. The variable resistor 38 is the central element in a resistive voltage divider also consisting of series resistors 42 and 44 which are arranged to form a serial connection between the supply voltage and ground.

A similar resistive voltage divider is formed of resistors 46, variable resistor 48, and resistor 50, also connected in series between the supply voltage and ground. The wiper arm of variable resistor 48 is connected by a capacitor 52 to ground and is also connected to the non-inverting input to the comparator 36.

The output of the comparator 36 is internally connected to the base of a transistor 54. The collector of the transistor 54 is connected through a resistor 56 to ground. The emitter of the transistor 54 is connected to the junction of a capacitor 58 connected to ground and a resistor 60 connected to the negative supply voltage. The collector of the transistor 54 is also connected to the base of a second transistor 62 which, in turn, has its collector connected through a resistor 64 to the positive supply and its emitter connected through a resistor 66 to the negative supply. The emitter of the transistor 62 is also connected through a capacitor 68 to the first output signal line 16 from the video mixer 10. The output signal line 16 is a synchronization pulse output.

The output of the comparator 32 is also internally connected to the base of a transistor 70 which has, in turn, its collector connected through a resistor 72 to the positive supply voltage and its emitter connected through a resistor 74 to the negative supply voltage. A resistor 76 is connected between the collector and emitter of the transistor 70 and a capacitor 78 connects the emitter of the transistor 70 to ground. The collector of the transistor 70 is also connected to the gate terminal of a metal oxide silicon field effect transistor (MOSFET) 80. The substrate terminal of the MOSFET 80 is connected to the negative supply voltage. The drain of the MOSFET 80 is connected as an input to an amplifier 82, the output of which is returned to the inverting input of the amplifier 82. Amplifier 82 serves as a summing or combining device to combine and transmit its two input signals. The output of the amplifier 82 is the output video signal 22 of the video mixer. The non-inverting input to the amplifier 82 is also connected through a resistor 84 to the input signal 14.

The output of the comparator 34 is internally connected to the base of a transistor 8 which has its collector connected through a resistor 88 to the positive supply voltage and its emitter connected through a resistor 90 to the negative supply voltage. A resistor 92 is connected between the collector and emitter of the transistor 86, and a capacitor 94 connects the emitter of the transistor 86 to ground. Also connected to the collector of the transistor 86 are diode 96 and a resistor 98 with the cathode of the diode 96 connected to the transistor 86. The other side of the diode 96 is connected through a capacitor 100 to ground. The collector of the transistor 86 is also connected to the gate terminal of a second MOSFET 102. The substrate terminal of the MOSFET 102 is connected to the negative supply voltage while its drain is connected to ground.

The secondary input 20 into the video mixer 10 is connected to ground by a resistor 104 and is also connected through a resistor 106 to the source inputs to each of the MOSFETs 80 and 102. The MOSFETs 80 and 102 serve as a video signal analog gating circuit in the mixer circuit of FIG. 3.

In its operation, the circuitry of FIG. 3 contained in the video mixer 10 functions to supply the necessary synchronization pulse information to the secondary video source, i.e. the video micrometer 18, and then to recombine the output of the secondary video source with the output of the primary video source without allowing the secondary video source to degrade or in any way impair the image quality of the primary video source, or to in any way disturb its synchronization. Therefore, the concept of the circuit of FIG. 3 is that the original composite video signal, on line 14, has the synchronization information stripped from it and that synchronization pulse is applied to the output line 16. The input line 20, from the secondary video source, is then combined with the composite video in the amplifier 82 to form the output video signal 22. However, the output from the secondary video source 20 is gated off during any of the intervals in which it might impair the accuracy of the original composite video signal received on line 14.

In detailed operation, the input composite video signal first travels to what is, in essence, a sync tip clamp consisting of capacitor 26, resistor 28, and diode 30. This references the black level voltage signal of the composite video to the bottom portion of the synchronization pulse. It is this signal which is applied as an input to the amplifiers 32, 34, and 36 which are connected to act, in essence, as voltage comparators.

The comparator 36 and its related components are connected as a synch stripper circuit. In the comparator 36, the inverting input is the sync tip clamped signal while the non-inverting input comes from the voltage divider composed of the resistors 46, 48, and 50. The adjustability of the variable resistor 48 allows for the reference signal to be set just slightly above the bottom of the signal of the synchronization pulse. A suitable voltage level might be 0.2 volts above the lowest voltage of the synchronization pulse. In this manner, the comparator 36 operates, and is switched, only during those time periods which are the extreme low voltage of the synchronization pulse. The output pulse of the comparator 36 switches the transistors 54 and 62 to create output pulses, passing through the capacitor 68 and onto the output line 16 during, and only during, the synchronization pulses contained in the original composite video signal received on input line 14. Thus the signal processing between input line 14 and output line 16 results in an output line 16 which consists of no video information with the sole exception of the synchronization pulsing necessary to synchronize the signal from the secondary video source with that of the primary video source.

The comparators 32 and 34 are connected with their related components as a discriminator to control the analog gating circuit of the MOSFETs 80 and 102. The comparators 32 and 34 are connected, as may be apparent by examining their input signals, to be complementary during the times in which they are respectively on and off. The output from the secondary video source, received on input line 20, as connected through the resistor 106 to the source terminal of each of the MOSFETs 80 and 102. Since the MOSFETs 80 and 102 are controlled by the comparators 32 and 34 respectively, the MOSFETS 80 and 102 operate substantially in complementary fashion. Again the voltage divider consisting of the resistors 38, 42, and 44 allows an adjustable reference to be made to determine the time period during which the comparators 32 and 34 switch on and off. In essence, operation of the comparators 32 and 34 is to switch on MOSFET 80 during the time periods of the second video input signal 20 which include no synchronization pulse, and to absolutely gate off any input from the second video input signal 20 to the summing amplifier 82 and the output from the video mixer during any time periods in which synchronization pulses are transmitted. Thus the comparator 32, which is off during synchronization pulse time periods, is connected to turn the MOSFET 80 on during time periods other than synchronization pulses. The comparator 34, which is connected to be on during synchronization pulses turns the MOSFET 102 on during those pulses. Thus, during the time period between synchronization pulses, the MOSFET 80 allows the secondary video signal to pass therethrough to its drain. During time periods in which a synchronization pulse is sensed, not only is the MOSFET 80 turned off, but the MOSFET 102 is turned on to firmly clamp the source of both MOSFETs 80 and 102 to ground, preventing any signal passage therethrough.

The function of the series circuit of the diode 96 and resistor 98 as well as the capacitor 100 is to serve as a pulse stretcher during the termination of the synchronization pulse. In essence, this RC combination prevents the transistor 86 from too sharply turning off the MOSFET 102, since the capacitor 100 must be discharged before the gate of the MOSFET 102 can be brought down in voltage. This is to insure that the clamping of the MOSFET 102 extends past the bottom of the synchronization pulse to cover the time period referred to as the "back porch" portion of the synchronization information in a composite video signal.

Thus, in essence, the MOSFETs 80 and 102 serve as an analog gating circuit to allow the input secondary video signal 20 to pass therethrough except during time periods of synchronization information, and the following "back porch." The output, applied at the drain of the MOSFET 80, is combined with the primary composite video input 14, applied through resistor 84, to the non-inverting input to the output amplifier 82. The output amplifier 82 simply combines and amplifies the composite signal and is simply a low noise, wide band width amplifier to provide a clean composite video output signal from the mixer of FIG. 3.

Thus, the circuit of FIG. 3 is intended to efficiently strip synchronization information from the input signal and to provide it separately from the remaining portions of the composite input signal to the secondary device. The mixer then also combines the output from the secondary video device with the primary composite video but prevents any degradation of information from the secondary video signal to in any way impact or impair the primary video signal.

Shown in FIG. 4 is a detailed circuit diagram of the other embodiment of the video mixer 10. The video mixer of FIG. 4 performs the function of synchronization or sync, stripping and then combines the primary and secondary video signals with the input from the secondary signal being limited to certain defined voltage levels. The original composite video signal into the video mixer 10 of FIG. 4 is applied to the video signal input line 14. That input line is connected through a capacitor 112 to the input pin of an integrated circuit 110 which is a synchronization pulse stripper circuit (e.g. LM118). The composite sync output pin of the integrated circuit 110 is connected through resistor 113 to the junction of the schottky diode 114 and the diode 116. The schottky diode 114 acts as a clamp to prevent negative sync pulses from going more than 0.4 volts below ground. The diode 116 is connected to the junction of the diode 118 and the resistor 119. Together, the diodes 116 and 118 prevent the signal baseline from going above ground potential. The resistor 119 connects the cathode of the diode 118 to the negative supply voltage, ensuring that the diode 118 is biased on. The input of the buffer amplifier 120 is connected to the junction of the schottky diode 114 and the diode 116. The output of the buffer amplifier 120 is connected to the first output signal line 16 from the video mixer 10.

The secondary input 20 into the video mixer 10 is connected to ground by a resistor 122 and is also connected to the junction of the resistors 124 and 126. The resistor 122 terminates the signal on line 20 which is from the secondary video source. The terminated signal flows through the resistor 124 into capacitor 134 forming an average value at the junction of the resistor 124 and the capacitor 134. This average value is connected to the negative input of the voltage comparator 130. The resistor 128 connects the negative input of the voltage comparator 130 to the positive voltage supply, and biases the average value found there to a slightly more positive value. The positive input of voltage comparator 130 is connected to the junction of the resistors 124 and 122 at which junction is found the instantaneous value of the signal on line 20 which is from the secondary video source. Therefore, the voltage comparator 130 compares the average value of the secondary video signal with its instantaneous value. When the instantaneous value exceeds the average value by the amount determined by the bias resistor 128, then the comparator output is high. Otherwise it is low. Therefore, a white line in the secondary video image indicated by a high instantaneous signal voltage, will cause the output of voltage comparator 130 to go high.

When the output of the voltage comparator 130 goes high, the junction of the resistor 142 and the diode 139 goes high. The cathode of the diode 139 is connected to ground by the diode 138. Therefore, the junction of the resistor 142 and the diode 139 is clamped to ground through two diode junctions. Therefore, when the output of the comparator 130 goes high, the junction of the resistor 142 and the diode 139 goes to a voltage level which is two diode junction potentials above ground. This voltage level is conducted through the diode 148 to the summing resistor 152. Since the diode 148 causes a drop of one diode junction potential, the voltage level presented to the summing resistor 152 is one diode junction potential above ground when the output of the comparator 130 goes high. In the case of schottky diodes, the diode junction potential presented to the summing resistor 152 is approximately 0.4 volts above ground, which corresponds approximately to a white video signal level.

Therefore, any presentation of a white line voltage level on the secondary input 20 into the video mixer 10 will cause a standardized fixed white video signal level to be presented to the summing resistor 152. This operation of the video mixer occurs regardless of the dynamic characteristics of the secondary video source signal, so some measure of isolation from adverse characteristics of that secondary video source is provided.

When the output of the comparator 130 goes low, a voltage level near the negative supply voltage is applied to the junction of the resistor 142 and the diode 139. This negative voltage level causes the diode 148 to be reverse biased, effectively isolating the output of the comparator 130 from the summing resistor 152. Therefore, any part of the secondary video signal which is not white will cause no effect through the voltage comparator 130.

The secondary video signal is also connected through the secondary input 20 into the video mixer 10, to the positive input of the voltage comparator 140. The secondary video signal is conducted from the positive input of the voltage comparator 140 to the capacitor 136 by a resistor 126, forming a second average value at the negative input of the voltage comparator 140. This second average value is biased to a slightly more negative value by the resistor 132. Therefore, the voltage comparator 140 does compare the instantaneous voltage of the secondary video signal at its positive input to an average value at its negative input biased to a slightly more negative voltage. When the instantaneous value is lower than the average value by the amount of the negative bias, then the positive output of the voltage comparator goes low, otherwise the positive output of the voltage comparator 140 stays in a high impedance state. This means that the video representation of a black line from the secondary video source (i.e. a low voltage level) will cause the output of the voltage comparator 140 to go low. Thus any part of the secondary video signal which is not black will cause no effect on the output of the voltage comparator 140.

The negative output of the voltage comparator 140 s connected to the junction of the resistor 146 and the diode 144. The anode of the diode 144 is connected to ground, and the cathode of the diode 144 is connected through the resistor 146 to the negative supply voltage, clamping the negative output of the voltage comparator to a negative voltage which is one diode junction potential below ground. When this type of voltage comparator (e.g. LM319) drives its output low, it does so by connecting its positive output to its negative output through a transistor. A term for this type of output circuit arrangement is "open collector output." If the diode 144 is chosen to match the output transistor of voltage comparator 140, then the clamp voltage will be such that the positive output of the voltage comparator 140 will be near ground potential when the comparator 140 is in its off state. Ground potential corresponds approximately to a video signal representation of black.

Therefore, any representation of a black line on the secondary input 20 into the video mixer 10 will be presented as a standardized fixed black video signal voltage to the summing resistor 152. As we have already shown, any representation of a white line on the secondary input 20 into the video mixer 10 will be presented as a standardized white video signal to the summing resistor 152. As we have further shown, voltage values of the secondary video which are neither white nor black (e.g. neither white lines nor black lines), are isolated from the summing resistor 152 by the respective actions of the voltage comparators 130 and 140.

The summing resistor 152 is connected to the junction of the summing resistor 154 and the non-inverting input of amplifier 150 forming a summing point. The summing resistor 152 conducts the standardized video signals previously formed by the voltage comparators 130 and 140 to the summing point at the non-inverting input of the amplifier 150. The resistor 154 connects the summing point at the non-inverting input of the amplifier 150 to the primary video signal on line 14. The primary video signal is added to the standardized secondary video signals at the summing point which is the non-inverting input of the amplifier 150. The output of the amplifier 150 is connected to line 22 which is the primary output of the video mixer 10. The output of amplifier 150 is the sum of its input voltages multiplied by the ratio of the value of the resistor 156 divided by the value of resistor 158. When the outputs of the voltage comparators 130 and 140 present a high impedance to the summing resistor 152, then the output of the amplifier 150 is substantially unaffected by the secondary video signal on line 20 which is the secondary input to the video mixer 10. When the resistors 156 and 158 are chosen for unity gain in amplifier 150, the primary output of the video mixer 10 on line 22 is a faithful reproduction of the primary video source on line 20 with the addition of certain standardized parts of the secondary video signal on the secondary input line 20.

It is to be understood that the present invention is not limited to the particular embodiment illustrated herein, but embraces all such modified forms thereof as come within the scope of the following claims.

Thus the video mixer circuit of FIG. 4 functions to strip the sync signal from the primary video signal and pass that signal to the source of the secondary video signal, just as did the mixer circuit of FIG. 3. In the circuit of FIG. 4, the secondary video signal is processed so that only its whit and black level signals are transmitted and combined with the primary video signal. In essence, only the extreme voltage values of the secondary video signal are used with all intermediate signal values being blocked. The mixer circuit of FIG. 4 thus performs a voltage level discrimination on the secondary video signal as distinguished from the time discrimination of the circuit of FIG. 3. Either mixer circuit results in improved quality of the resulting combined video signal and they may be used alternatively, or even jointly in one implementation, as needed depending on the type of signal degradation being experienced in the secondary video signal.

What is claimed is:

1. A video mixer circuit for adding to a first video signal input portions of a second video signal input, the mixer comprising:

sync stripper means for separating the synchronization pulse from the first video signal input and providing a synchronization pulse output to the source of the second video signal input;

voltage comparator means responsive to one of the first and second video signal inputs for blocking passage of the second video signal except during defined voltage levels of the video signal; and summing means to sum the first video signal to those portions of the second video signal which are not blocked by the voltage comparator means.

2. A video mixer circuit as claimed in claim 1 wherein the sync stripper means comprises a comparator and a reference voltage, the comparator connected to compare the first video signal input to the reference voltage to create an output only during the synchronization pulse of the first video signal.

3. A video mixer circuit as claimed in claim 2 wherein the reference voltage is created by an adjustable resistance voltage divider.

4. A video mixer circuit as claimed in claim 1 wherein the summing means comprises a circuit junction and an output amplifier.

5. A video mixer as claimed in claim 4 wherein the first video signal and the output of the voltage comparator means are each connected through summing resistors to the circuit junction which is an input to the output amplifier.

6. A video mixer as claimed in claim 1 wherein the voltage comparator means is responsive to the first video signal input.

7. A video mixer as claimed in claim 6 wherein the voltage comparator means comprises first and second voltage comparators each connected to the first video signal input and each connected to a respective reference voltage, the first and second comparators being connected in opposite polarities so that one is off when the other is on.

8. A video mixer as claimed in claim 7 wherein the mixer further comprises analog gating means for connecting the second video signal to the summing means, the analog gating means connected to be operated by the first and second voltage comparators so as to gate through the second video signal to the summing means only when the first video signal is above the reference voltage of the first voltage comparator.

9. A video mixer as claimed in claim 8 wherein there are two of said analog gating means each connected to the output of a respective one of the first and second voltage comparators, one of said gating means connected for conducting the second video signal through to the summing means, the other of said gating means connected for clamping the second video signal off.

10. A video mixer as claimed in claim 1 wherein the voltage comparator means is connected to be responsive to the second video signal input.

11. A video mixer as claimed in claim 10 wherein the voltage comparator means includes averaging means to average the second video signal input over time and wherein the voltage comparator means is connected to compare the instantaneous voltage on the second video signal to the average signal to operate only when the instantaneous level differs from the average level by a selected voltage.

12. A video mixer as claimed in claim 11 wherein the averaging means comprises a resistor and a capacitor in series circuit.

* * * * *